(12) United States Patent
Jevsnik et al.

(10) Patent No.: US 9,320,203 B2
(45) Date of Patent: Apr. 26, 2016

(54) SUBSTANCE INTRODUCTION METHOD FOR PLANT, CONTAINER, AND COMBINATION OF PLANT AND CONTAINER

(71) Applicant: HANSON UITGEVERS B.V., Rotterdam (NL)

(72) Inventors: Tomaz Jevsnik, Dobrovnik (SI); Auguste Antoine Van Der Kaaden, Moerkapelle (NL)

(73) Assignee: HANSON UITGEVERS B.V., Rotterdam (NL)

( * ) Notice: Subject to any disclaimer, the term of this patent is extended or adjusted under 35 U.S.C. 154(b) by 0 days.

(21) Appl. No.: 14/498,761

(22) Filed: Sep. 26, 2014

(65) Prior Publication Data

US 2015/0089872 A1    Apr. 2, 2015

(30) Foreign Application Priority Data

Sep. 27, 2013   (NL) .................................... 1040416

(51) Int. Cl.
  *A01G 7/06* (2006.01)
  *A01G 9/02* (2006.01)

(52) U.S. Cl.
  CPC ... *A01G 7/06* (2013.01); *A01G 9/02* (2013.01)

(58) Field of Classification Search
  CPC .................................. A01G 7/06; B47K 3/105
  USPC ......................................................... 47/57.5
  See application file for complete search history.

(56) References Cited

U.S. PATENT DOCUMENTS

| 2,044,063 | A |   | 8/1936  | Dahlberg |
|-----------|---|---|---------|----------|
| 2,927,401 | A |   | 3/1960  | Little |
| 3,295,254 | A |   | 1/1967  | Schoonman |
| 3,864,874 | A | * | 2/1975  | Norris et al. .................... 47/57.5 |
| 3,920,393 | A | * | 11/1975 | Baynes ................. B27K 3/105 |
|           |   |   |         | 118/205 |
| 3,971,159 | A | * | 7/1976  | Brown et al. ...................... 47/10 |
| 3,992,813 | A | * | 11/1976 | Freshel .......................... 47/57.5 |
| 4,196,543 | A | * | 4/1980  | Dedolph .......................... 47/5.5 |
| 4,348,834 | A | * | 9/1982  | Martin, Jr. ................. 47/58.1 R |
| 4,698,935 | A | * | 10/1987 | Cronenwett et al. ........... 47/57.5 |
| 4,896,454 | A |   | 1/1990  | Cronenwett et al. |

(Continued)

FOREIGN PATENT DOCUMENTS

CA    2 562 325 A1    4/2008
DE    39 42 368 A1    6/1991
(Continued)

OTHER PUBLICATIONS

ARBORJET.PALMjet palm nutrition 2009, pp. 1-2.
(Continued)

*Primary Examiner* — David Parsley
*Assistant Examiner* — Danielle Clerkley
(74) *Attorney, Agent, or Firm* — Birch, Stewart, Kolasch & Birch, LLP

(57) ABSTRACT

A method for introducing a substance into a plant, in particular a pot plant, includes forming a hole into a stem of the plant to get access to a transportation system of the plant; arranging a container around the stem of the plant, such that substances held by the container are able to enter the transportation system of the plant through the hole in the stem; and filling the container with the substance. A container, the combination of a plant and container, and a container fabrication method are also disclosed.

31 Claims, 7 Drawing Sheets

(56) References Cited

U.S. PATENT DOCUMENTS

| | | |
|---|---|---|
| 5,239,773 A | 8/1993 | Doolittle, Jr. |
| 5,477,638 A | 12/1995 | Corradi et al. |
| 5,797,215 A | 8/1998 | Doolittle et al. |
| 6,405,480 B1 | 6/2002 | Martin |

FOREIGN PATENT DOCUMENTS

| | | |
|---|---|---|
| EP | 0 062 564 A1 | 10/1982 |
| EP | 2308282 A1 | 4/2011 |
| FR | 2 879073 A1 | 6/2006 |
| GB | 407416 A | 3/1934 |
| NL | 2008189 C | 7/2013 |
| WO | WO 87/01559 A1 | 3/1987 |
| WO | WO 93/02546 A1 | 2/1993 |
| WO | WO 2010/085082 A2 | 7/2010 |
| WO | WO 2012/067496 A1 | 5/2012 |

OTHER PUBLICATIONS

Kapur et al., "Chemo-trunk injection for the control of citrus greening," Indian J. Virol. vol. 12, No. 1, Paes 55-57 (1996).

Orr et al., "Field observations of tree injection," Journal of Arboriculture, vol. 14, No. 11, pp. 269-273 (1988).

Schwenk et al., "Inoculation of soybean plants by injection with Zoospores of *Phytophthora megasperma* var. *sojae*.," The American Phytopathological Society, vol. 69, No. 12 (1979) 1233-1234.

\* cited by examiner

SUBSTANCE INTRODUCTION METHOD FOR PLANT, CONTAINER, AND COMBINATION OF PLANT AND CONTAINER

BACKGROUND OF THE INVENTION

The invention relates to a substance introduction method for a plant, in particular a pot plant, e.g. an orchid.

Over the years many different substance introduction methods have been developed to introduce all kinds of substances into a plant, mainly by fluid introduction, which substances may comprise pesticides, fungicides, nutrients, water, flavorants, odorants, colorants and suitable solutions thereof.

An example of a prior art substance introduction method can be found in international patent publication WO93/02546 in which hollow spikes, which are in communication with a reservoir, are pressed into the stem of a plant, such that a transverse passageway of the spikes is located within the xylem system of the plant. Any fluid inside the reservoir is then taken up by the plant using the transpiration pull of the xylem system.

A disadvantage of WO93/02546 is that the system required to perform this method is rather complex. Fabricating and positioning the spikes with the transverse passageways is not easy.

Another example of a prior art substance introduction method can be found in international patent publication WO87/01559 in which an unpressurized reservoir is connected to the plant via a probe that is able to penetrate the epidermis of the stem of the plant.

A disadvantage of WO87/01559 is that the construction with the reservoir and probes is relatively large compared to the size of the stem of the plant, so that additional mounting aids are required. An additional disadvantage of using probes or needles, e.g. hypodermic needles, that remain connected to the stem during the substance introduction is that there is a significant risk to damage the stem of the plant while handling the probe/needle due to the sharp tip of the probe/needle.

Another example of a prior art substance introduction method can be found in international patent publication WO2012/067496 in which the roots of the plant are physically injured and subsequently the injured roots are brought into contact with a fluid.

A disadvantage of WO2012/067496 is that the plant is severely injured with the chance of the plant dying and that the method is laborious, because of the many steps required, as for instance the plant needs to be taken out of the soil to injure the roots.

A further example of a prior art substance introduction method can be found in European patent publication EP2.308.282 in which a hole is made into the stem of the plant to receive the tip of a pipette, which pipette needs to be fixed to the plant until the fluid is absorbed by plant.

A disadvantage of EP2.308.282 is that it is not easy to fix the pipette to the plant without leakage.

Yet another example of a prior art substance introduction method can be found in French patent publication FR2.879.073 in which the plant is watered with a substance containing fluid, which is then absorbed by the roots in a natural way.

A disadvantage of FR2.879.073 is that in order for the plant to absorb a certain amount of fluid, a multiple of that amount needs to be introduced into the soil around the plant. Hence, the efficiency is very low compared to methods where the substance containing fluid is administered to the plant in a more direct way.

Another example of a prior art substance introduction method can be found in international patent publication WO2010/085082 in which branches are cut and a storage tube is coupled to the cut branch to introduce fluid into the plant.

A disadvantage of WO2010/085082 is that cutting the branches is not possible or desired for all types of plants, that it is not the most efficient method, that it reduces the value of the plant, and that it requires special measures to make a proper seal between the tube and the cut branch in order to prevent fluid from unintentionally leaking away between the tube and the branch.

A further example of a prior art substance introduction method can be found in US patent publication U.S. Pat. No. 6,405,480 in which a reservoir is formed around the cut stem of a Christmas tree, so that fluid can be forced into the stem to prevent the tree from drying and becoming a fire hazard.

U.S. Pat. No. 6,405,480 assumes that the stem is cut, which is usually the case with a Christmas tree, but is most of the time for all other purposes not desired. Further, the disclosure is complex to implement in practice for a pot plant when the intention is to keep the plant alive for more than a couple of weeks.

Substances may be introduced into plants for different reasons. Pesticides, nutrients, etc. are usually introduced to improve the well-being of the plant, while flavorants, colorants, odorants and the like are introduced to improve the esthetic value perceived by customers buying or using the plants. It is known that some of these substances may be harmful to the plant and that depending on, amongst others, the substance introduction method the life of the plants is shortened or some parts of the plant, such as the flowers or buds, die easily and/or quickly.

BRIEF SUMMARY OF THE INVENTION

In view of the above it is an object of the invention to provide an improved method for introducing a substance into a plant, in particular a pot plant.

To achieve this object, there is provided a method for introducing a substance into a plant, in particular a pot plant, wherein said method comprises the following steps:
  forming a hole into a stem of the plant to get access to a transportation system of the plant;
  arranging a container around the stem of the plant, such that substances held by the container are able to enter the transportation system of the plant through the hole in the stem; and
  filling the container with the substance.

The use of a container arranged around the stem of the plant has been found to have the potential of multiple advantages. These advantages may include:
1. a reduction of the bending moments applied to the stem of the plant;
2. reinforcement of the stem of the plant;
3. a reduction in the required interaction with (parts of) the hole in the stem;
4. a reduction in the required operations to be carried out on the plant; and/or
5. an improved seal around the hole in the stem.

The reduction of applied bending moments to the stem of the plant may be caused by the fact that the container is close to the stem and is able to distribute the loads over a relatively large area around the hole in the stem including an area opposite the side where the hole is situated.

Arranging the container around the stem may introduce additional stiffness counteracting the weakening of the stem by the formation of the hole into the stem thereby reinforcing the stem of the plant at the location of the hole in the stem.

In prior art methods, tools such as probes, needles or pipettes have to be introduced into the hole in the stem in order to introduce the substances into the plant, where care has to be taken not to injure the plant and to minimize leakage of the substances. Any engagement between tool and plant is then taking place at or near the hole in the stem where space is limited and the strength of the stem is minimal. Arranging a container around the stem of the plants allows some of the interaction between tool and plant to take place via the container. The container may be configured to provide enough space and/or strength. As an example, there is no longer a need for engagement between a tool and the hole in the stem, e.g. the sidewall of the hole. Instead, the container may be provided with a hole for engagement with the tool. The loads associated with the tool are then distributed by the container to an outer surface of the stem keeping the hole in the stem free of relatively large loads. The container may also be used to provide a seal around the hole in the stem, so that no longer a direct seal is required between the tool and the hole in the stem.

Hence, the use of the container may eliminate the requirement of introducing a tool into the hole. Even if a tool is introduced into the hole, the use of the container may eliminate the requirement of providing a seal between the tool and the hole in the stem of the plant. As a result, the risk of injuring the plant is reduced.

Arranging a container around the stem of the plant may also have the advantage that the container once it is filled can stay on the stem of the plant and does not need to be removed. This would eliminate the operation of removing the container. Once the container is placed and filled the plant does not have to be handled anymore. This even allows for refilling of the container.

In order to prevent leakage, a seal is preferably formed around the hole. Due to the container being arranged around the stem, there is more design freedom to provide a proper seal. The seal may for instance be situated further away from the hole than in the prior art, such that the seal is situated in an area of the stem which is stronger allowing to withstand more sealing pressure and thus resulting in a better seal.

It will be clear to the skilled person that the substances to be introduced into the plant may be introduced in any form including solid substances, e.g. powder, and fluidic substances, such as liquids, gasses, solutions, etc. Another advantage of the container may be that it allows to mix substances inside the container. For instance, a colorant may be introduced in the container in powder form and subsequently a liquid, e.g. water, may be introduced into the container to dissolve the powder into the water to get a solution that can be taken up by the plant.

In an embodiment of the invention, filling of the container may comprise introducing a substance into the hole in the stem, wherein the substance is introduced into the hole in the stem in powder form, subsequently arranging the container around the stem and filling the container with a fluid, e.g. water. In one situation, when the fluid passes the substance to enter the plant via the hole in the stem a little bit of substance may be dissolved into the fluid. In another situation, the powder is fully dissolved into the fluid before being taken up by the plant.

The substances may include:
pesticides;
fungicides;
nutrients;
flavorants;
colorants;
odorants;
and any mixtures or suitable solutions thereof.

The substance may alternatively be referred to as matter, component, ingredient, element, constituent, material and essence, and for instance also as compound, mixture, blend or composition when the substance contains multiple ingredients.

Arranging around the stem in this specification means that at least half of the circumference of the stem is covered and/or engaged by the container.

Filling of the container in this specification means at least that there is a transfer of substance from outside to inside the container where it is irrelevant whether the transfer is effected by moving the substance, the container or both. Filling may result in substance getting in between the container and the outer surface of the stem, but this is not necessary for this invention. It is sufficient when the substance is in the hole in the stem and is directly or indirectly surrounded by the container. In both cases the substance is said to be arranged between the stem and the container as the substance in contact with the stem (or an internal portion of the stem) on one side and the container on the other (opposite) side.

A hole in this specification is broadly defined and includes any cavity, cut or passageway extending from an opening in an outer surface of the stem into the interior of the stem allowing the interior of the stem to be exposed to a substance entering the plant via the opening. As an example, making a longitudinal cut in the stem of the plant falls within this definition when this results in an opening in the outer surface of the stem through which a substance can enter the interior of the stem of the plant. Hence, in case a cut is made with a very thin blade resulting in injuring the stem of the plant, but in which the opposing walls of the cut are sealed together, so that no substance can enter the interior of the stem of the plant, this is not a hole as defined in this specification.

Although at first sight the method according to the invention may resemble the method disclosed in WO2010/085082, they differ very much as they are based on different principles. The only common feature is the filling of a container with substance. Because the containers of WO2010/085082 are placed on cut branches of the plant, no hole is formed in the stem of the plant and the containers are thus also not arranged around the stem of the plant such that fluid held by the containers can enter the transportation system of the plant via the hole. Hence, WO2010/085082 is based on the principle of fluid introduction via a cut or injured branch and not via a hole in the stem.

The method according to the invention may also at first sight resemble the method disclosed in GB407,416, but also in this patent publication no hole is formed in the stem and further no container is filled with substance. GB407,416 teaches that damaged trees can be treated and survive by artificially restoring the sap transportation facilities of the tree and closing the wound in an air and watertight manner.

In the remainder of this specification, the container will be described by reference to multiple states, which multiple states include at least an assembled state in which it is arranged around the stem of the plant and an unassembled state in which it is not arranged around the stem of the plant.

In the assembled state the container will define an internal volume between the stem and the container that may be occupied by the substance when filling the container. This internal volume may be very small compared to the amount of substance that is to be introduced into the plant, e.g. the internal volume is below 50% of the volume of substance to be introduced into the plant, so that a reservoir needs to be connected to the container for a certain amount of time to ensure that enough substance is introduced into the plant. In other words, the time the substance is in the container before it is taken up by the plant is relatively small. In such an embodiment, the step of filling the container with the substance may comprise the steps of connecting the container to a reservoir, transferring substance from the reservoir to the container, and disconnecting the reservoir from the container, such that the substance mainly enters the transportation system of the plant through the hole in the stem when the reservoir and container are connected to each other.

When the internal volume is large compared to the amount of substance that is to be introduced into the plant, e.g. the internal volume is above 50% of the volume of substance to be introduced into the plant. In other words, the time the substance is in the container before it is taken up by the plant is relatively large, the step of filling the container with the substance may in that case comprise the steps of temporarily connecting the container to a reservoir, transferring a predetermined amount of substance from the reservoir to the container, and disconnecting the reservoir from the container, such that the substance mainly enters the transportation system of the plant through the hole in the stem when the reservoir and container are disconnected from each other. It is to be noted that arranging of the container around the stem of the plant can be done prior to filling the container using a reservoir, but can also be done after filling the container using the reservoir. Or in other words, filling the container is carried out prior to arranging the container around the stem of the plant, or filling the container is carried out after arranging the container around the stem of the plant.

In the case that the internal volume equals or is larger than the required volume, the connection between container and reservoir only needs to be as long as it takes to fill the container and then the connection may be broken. Hence, the container only needs to be filled once with a volume of substance equal or less to the internal volume. When this is combined with a disposable container allowing to leave the container on the plant, it is possible to process the plant only once to form the hole, arrange the container around the stem and fill the container with substance after which the connection to an external reservoir may be immediately broken and there is no need to wait for the substance to be taken up by the plant and the removal of the container before the plant can be sold or transported. Instead the plant is sold or transported with the container still arranged on the stem of the plant and in the meantime substance inside the container is taken up by the plant.

The internal volume of the container may vary from plant to plant as it may depend on the diameter of the stem, the size of the hole in the stem, and the elasticity of the container.

The container may for instance comprise elastic material that can stretch upon filling of the container with substance, i.e. like a balloon, and thereby increases the internal volume of the container.

The presence of elastic material in the container may be beneficially used to:
1. provide a seal between the container and stem and/or a tool possibly extending through the container;
2. prevent the container from falling of the stem of the plant;
3. fold the container around the stem of the plant; and/or
4. vary the size of the container over time e.g. as described above to increase the size of the internal volume of the container like a balloon.

In an embodiment, at least the portions of the container that contact the stem of the plant in the assembled state of the container are made of elastic material, so that a good seal is provided between the container and the stem of the plant thereby preventing substance from inadvertently escaping from the container in assembled state.

In an embodiment the container comprises elastic material such that in assembled state the container is clamped around the stem of the plant thereby introducing enough friction forces to keep the container in place on the stem of the plant. Preferably the container comprises elastic material and has an internal diameter in the unassembled state which is less than the diameter of the stem of the plant, so that when the container is arranged around the stem of the plant, the elastic material is stretched causing a restoring force allowing to clamp the container around the stem of the plant.

In a less preferred embodiment, the container does not comprise elastic material and the method relies on the resiliency of the stem of the plant itself to provide a good seal and to prevent the container from falling of the stem. This embodiment, although possible and falling within the scope of the invention, is less preferred because the risk of damaging the stem of the plant is too high.

In an embodiment, the container comprises elastic material, wherein the container has a cavity and two openings at opposite sides of the cavity, wherein the cavity is delimited by a continuous wall seen in circumferential direction of the two openings, and wherein arranging the container around the stem of the plant comprises the following steps:
  stretching the elastic material of the container such that the size of the openings and the cavity increases for passing plant portions such as leaves, flowers, buds or branches;
  moving the container over the plant until the container is in a desired position with respect to the stem of the plant; and
  releasing the elastic material of the container, such that the container engages with the stem of the plant.

In this embodiment, moving the container over the plant is preferably mainly in a direction parallel to a longitudinal axis of the stem of the plant.

In another embodiment, the container comprises elastic material, wherein the container has a cavity and two openings at opposite sides of the cavity, wherein the cavity is delimited by a wall with two wall portions that can be moved away from each other to form or increase the size of an additional opening extending between the two openings of the container, and wherein arranging the container around the stem of the plant may be carried out by folding the container around the stem of the plant and/or preferably comprises the following steps:
  moving the two wall portions of the wall of the container away from each other to form or increase the size of the additional opening;
  moving the container over the stem until the stem has passed the additional opening thereby entering the cavity; and
  releasing the two wall portions of the wall of the container, such that the container engages with the stem of the plant.

In this embodiment, moving the container over the stem is preferably mainly in a direction perpendicular to a longitudinal axis of the stem of the plant.

In yet another embodiment, arranging the container around the stem of the plant involves folding of the container around the stem of the plant and connecting the portions of the container that meet each other while folding the container around the stem, thereby forming a cavity with two openings through which the stem of the plant extends.

In an embodiment, the container can be shaped to form a cavity and two openings at opposite sides of the cavity, so that the container can be arranged around the stem of the plant. Arranging the container around the stem may comprise folding the container around the stem of the plant. The cavity may be delimited by a wall with two wall portions that can be separated from each other to form an additional opening extending between the two openings of the container, wherein arranging the container around the stem of the plant may comprise the following steps:

forming the additional opening to allow the stem of the plant to pass the wall portions;

folding the container around the stem of the plant, so that the stem of the plant is introduced into the cavity via the additional opening;

connecting the wall portions together, thereby arranging the container around the stem of the plant.

The container may comprise elastic material, but may additionally or alternatively comprise flexible non-elastic material. More than 50% of the container may be elastic material, preferably more than 80%. It is even envisaged that 100% of the container is made of elastic material.

In an embodiment, the container comprises two components, wherein each component only partially surrounds the stem of the plant seen in circumferential direction when the container is arranged around the stem of the plant, and wherein arranging the container around the stem of the plant comprises positioning the two components at opposite sides of the stem of the plant and connecting the two components to each other.

In another embodiment, the container comprises two components, wherein each component only partially surrounds the stem of the plant seen in circumferential direction when the container is arranged around the stem of the plant, and wherein arranging the container around the stem of the plant comprises hingedly connecting the two components together at one side, folding the hingedly connected components around the stem of the plant and connecting the two components to each other at the side opposite to the hinged connection.

Connecting two components or two wall portions to each other may involve gluing, taping or connecting using a snap connection, but it will be apparent to the skilled person that many suitable connection methods are available and all fall within the scope of the invention.

The container may also comprise more than two components, e.g. three or four components, but in that case it is preferred that the components are hingedly connected to each other except for two components which allows the container to be folded around the stem of the plant after which said two components are connected to each other to arrange the container around the stem of the plant.

To hingedly connect components together use may be made of all kinds of hinge types, including hinges made of flexible material or of moving components.

Preferably, the position of the container relative to the stem of the plant after arranging the container around the stem of the plant is fixed, e.g. by gluing or taping, where the glue/adhesive or tape used may also be used to provide a seal between the container and the stem of the plant. This fixation may be temporarily or permanent which depends on whether the container is removed or not.

The hole in the stem of the plant may be a through hole, such that two openings are formed in the stem of the plant, but in a preferred embodiment, the hole is a blind hole, wherein preferably the depth of the hole is larger than the radius of the stem of the plant.

In case access to the hole is allowed through multiple openings, e.g. as described above for the through hole, the container is preferably arranged around the stem of the plant such that it covers all openings, i.e. substance is allowed to enter the hole via all openings.

The diameter of the opening of the hole is preferably above the 2 mm, more preferably 3 mm. The maximum diameter is determined by the diameter of the stem of the plant.

The hole formation in the stem of the plant may be carried out using drilling. The hole formation in the stem of the plant may additionally or alternatively be carried out using cutting. Forming the hole into the stem of the plant may for instance comprise inserting a hypodermic needle with a beveled tip into the stem and subsequently rotating the needle about its longitudinal axis. In this way, the side edges of the beveled tip can cut through the plant tissue when rotating the needle. During this process the longitudinal axis of the needle may be perpendicular to a longitudinal axis of the stem of the plant or the longitudinal axis of the needle may make an acute angle with respect to the longitudinal axis of the stem, preferably said acute angle is between 30-60 degrees, more preferably 45 degrees. It is also possible that these steps are carried out twice, once with the longitudinal axis of the needle perpendicular to the longitudinal axis of the stem and once when the longitudinal axis of the needle makes an acute angle with respect to the longitudinal axis of the stem.

It is to be noted that there is no need to remove plant tissue from the stem. The goal of the hole formation is to expose the interior of the stem to the substance. This requires no removal of tissue, but enough space to allow contact between substance and internal tissue. Of course, removal of tissue may also occur.

In an embodiment, the hole is formed by the following subsequent steps:

a) inserting the beveled tip of the hypodermic needle into the stem;

b) rotating the needle about its longitudinal axis, wherein during this step and the previous step the longitudinal axis of the needle is perpendicular to a longitudinal axis of the stem;

c) retracting the hypodermic needle from the stem;

d) inserting the beveled tip of the hypodermic needle into an opening of the hole formed during steps a)-c), wherein the longitudinal axis of the needle makes an acute angle with the longitudinal axis of the stem;

e) rotating the needle about its longitudinal axis;

f) retracting the hypodermic needle from the stem.

In a preferred embodiment, the tip of the hypodermic needle is directed towards a free end of the stem of the plant, i.e. away from the roots, which is most of the times upwards, so that an additional cavity is formed above the opening in the stem of the plant. Additionally or alternatively a cavity may be formed below the opening in the stem of the plant.

When the introduction of substance into the plant is or has ended, the container may be removed and the hole may have to be closed in order to prevent the plant from dying. The hole may be closed after removal of the container, but when the container remains on the stem, the hole is closed when the container is still present.

The step of closing the hole may comprise providing the interior wall of the hole with a layer of material preventing said wall from drying, i.e. applying a layer of material to the interior wall. This layer of material may for instance be sprayed into the hole or by exposing the interior of the hole to a solution such that a layer of material is deposited on the interior wall of the hole.

The hole in the stem is preferably closed using wax, preferably bee wax, and/or the interior wall is provided with a layer of wax, preferably also bee wax. Providing a layer of material on the interior wall of the hole and closing the hole may be done in a single operation by completely filling the hole with material, e.g. the bee wax.

In order to aid the substance introduction into the plant, the container may be pressurized to force the substance into the plant. Pressurizing the container may be done in many ways including:

introducing pressurized gas or liquid into the container, e.g. after filling the container;

filling the substance under pressure into the container, e.g. by providing the reservoir connected to the container at a height level above the container;

using a separate device adapted to apply pressure to the container, e.g. an elastic member such as a rubber band.

The invention also relates to a container for use in the method according to the invention described above.

The container may comprise a bottom portion and a top portion. The bottom portion and top portion are each provided with a respective opening. The container further comprises a cavity extending between the opening in the bottom portion and the opening in the top portion to receive the stem of a plant. The cavity may be in the form of a bore. The cavity is delimited by a cavity side wall which can be divided into a bottom side wall portion and top side wall portion associated with the bottom portion and top portion of the container respectively. The bottom side wall portion is configured to sealingly engage with the stem of a plant. The container further comprises a fill opening for filling the container with substance.

Filling of the container is not necessarily performed prior or after arranging the container around the stem of the plant. Hence, in an embodiment the fill opening is accessible only prior to arranging the container around the stem, in which case the container needs to be filled prior to arranging the container around the stem. The fill opening may alternatively still be accessible after arranging the container around the stem even when it has no function anymore. The accessibility of the fill opening after arranging the container around the stem may be the automatic result of fabrication conditions or design choices, but it may also be done on purpose to allow to refill the container via the fill opening.

When the container is filled after arranging the container on the stem of the plant it is required that the fill opening in the container is directly or indirectly accessible for filling purposes.

In an embodiment, the fill opening is provided in a middle portion of the container arranged between the bottom portion and the top portion. The fill opening may comprise a non-return valve.

In an embodiment, multiple fill openings are provided. This may for instance be beneficial if the cavity of the container is divided into distinct chambers when the container is arranged around the stem of the plant, and each chamber has one or more fill openings to fill the chamber with substance.

In an embodiment, the side wall delimiting the cavity is continuous seen in circumferential direction of the openings.

In another embodiment, the side wall delimiting the cavity comprises a first wall portion and a second wall portion that can be moved away from each other to form or increase the size of an additional opening extending between the opening in the bottom portion and the opening in the top portion of the container. The first and second wall portion may be configured to be connected to each other.

In an embodiment, the container is at least partially made of elastic material. The elastic material may be beneficially used to form a seal between the container and the stem of the plant in order to prevent substance from escaping from the container other then by entering the transportation system of the plant via the hole.

The elastic material may further aid in arranging the container, as the container then can be opened to the extent that it can be arranged around the stem of the plant in a desired location and then upon releasing of the container automatically returns towards its original shape thereby engaging with the stem of the plant, and preferably also substantially automatically providing a seal between the container and the stem of the plant at least at the bottom side wall portion.

The elastic material may also be beneficially used to conceal a disposable container after the substance has been introduced into the stem via the hole, because the elastic material allows for different internal volumes. When the container is filled, the elastic material may stretch in order to increase its internal volume and receive the substance. At this point in time, the size of the container may be relatively large and the container may be easy to notice. However, as the substance in the container will be absorbed by the plant over time, the required internal volume will decrease and due to the elastic material, the size of the container will decrease, so that in the end, the size of the container may be such that the container is hardly noticable.

The elastic material may further be beneficially used to provide a container that is able to provide a pressure to the fluid for forcing the fluid into the stem using the restoring forces of the elastic material after stretching it.

When the container is disposable and remains on the plant even when transported and/or sold, efforts are preferably made as described above to make the container less visible for the user, i.e. to disguise the container for the user, e.g. the end consumer. In addition or alternatively to the elastic material that ensures minimal occupied space of the container, possible measures that can be taken may include making the container transparent or giving it substantially the same color as the stem of the plant. Other efforts may relate to the size of the container, where a long slim container similar to the shape of the stem is preferred above a short thick container as in case of the latter the difference in diameter compared to the stem of the plant will be noticed earlier/easier.

In an embodiment, the container comprises at least two components, each component only partially surrounding the stem of the plant seen in circumferential direction when arranged on the stem of the plant In an embodiment, two or more of the at least two components are hingedly connectable to each other.

In an embodiment, the top side wall portion is also configured to sealingly engage with the outer surface of the stem of a plant. This allows for instance to separate the internal volume of the container, i.e. the cavity, from the outside once the container is arranged around the stem, which may be beneficial as water or any other liquid present in the container may not escape due to evaporation and/or because no dirt or other particles may enter the cavity.

Many other possible features of the container have already been described above in relation to the container used in the substance introduction method. These features will not be repeated here, but it will be apparent for the skilled person that these features may also apply to the container according to the invention.

The invention also relates to a combination of a plant, in particular a pot plant, and a container according to the invention, wherein said container is arranged around the stem of the plant, and said plant comprises a hole in the stem, so that substances held by the container can enter the transportation system of the plant via the hole in the stem.

Preferably the plant is not a woody stemmed type plant, but comprises soft stem tissue with hard outer wall (e.g. cuticle) or epidermis (e.g. as in herbaceous plants). The plant is preferably a plant that at least in its youth stage has stems that are not lignified. The plant is preferably a herbaceous plant with soft stem tissue.

Preferably the plant is a vascular plant, more preferably a plant in the orchid family (orchidaceae) and most preferably the plant is a Phalaenopsis orchid or a Denbromium orhid.

The container is preferably arranged around a stem with soft stem tissue, e.g. a flower stem.

The hole in the stem preferably has a depth which is larger than a radius of the stem at the location of the hole. The depth of the hole may for instance be between 50% and 90% of the diameter of the stem, preferably between 60% and 90% of the diameter of the stem, and more preferably between 75% and 85% of the diameter of the stem. The diameter of the hole may be in the range of 30% to 70% of the diameter of the stem and is preferably between 40% to 60% of the diameter of the stem.

In an embodiment, the container is arranged around the stem of the plant, such that the container supports the plant at two distinct positions along the stem of the plant, one position being below the hole and the other position being above the hole seen in longitudingal direction of the stem.

In an embodiment, the container is tubular. The diameter of the container in unassembled state is preferably smaller than the diameter of the stem of the plant.

The invention further relates to a fabrication method for fabricating a container according to the invention, comprising injection molding or extrusion.

In an embodiment, the container is injection molded or extruded as a single component.

In an embodiment, the fabrication method comprises the following steps:
  extruding a length of material; and
  cutting the length of material into multiple containers of desired length.

The fill opening may be formed by drilling, cutting or piercing through a side wall of the container.

BRIEF DESCRIPTION OF THE DRAWINGS

The invention will now be described in a non-limiting way with reference to the accompanying drawings in which like parts are indicated by like reference symbols and in which.

DETAILED DESCRIPTION OF THE INVENTION

Figure 1:
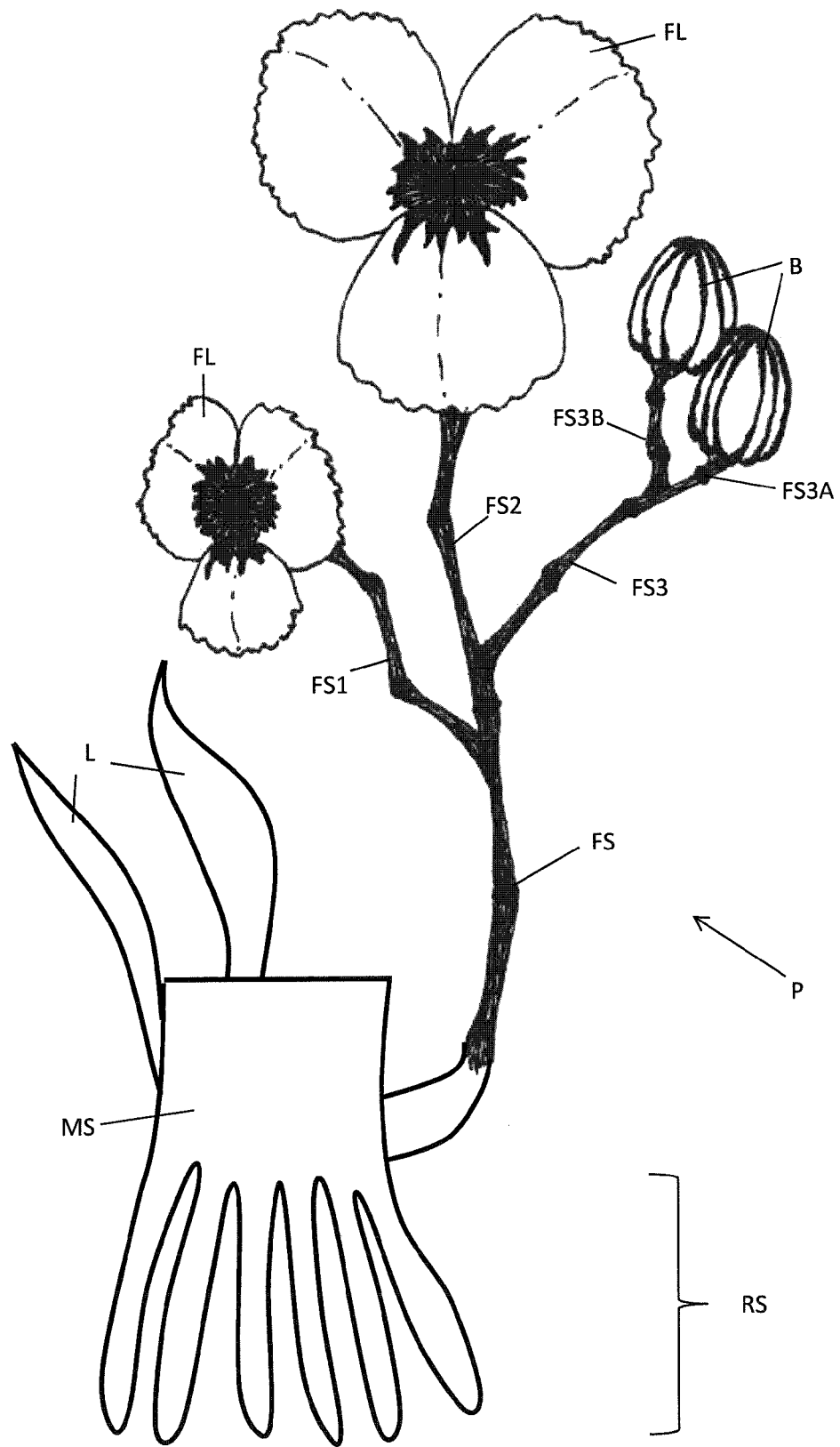
FIG. 1 depicts schematically a plant, in particular a pot plant.

FIG. 1 depicts a schematic drawing of a plant P, in particular a pot plant. FIG. 1 shows schematically the different parts of a plant. The shown parts of a plant are the root system RS, the stem structure including the stems MS, FS, FS1, FS2, FS3, FS3A, FS3B of the plant, the leaves L of the plant, the flowers FL of the plant and the buds B of the plant.

The root system RS of the plant is the non-leaf, non-nodes bearing part of the plant. The major functions of the root system may be one or more of the following:
  1) absorption of water and inorganic nutrients;
  2) anchoring of the plant body to the ground or any other base structure and supporting it;
  3) storage of food and nutrients;
  4) vegetative reproduction.

The root system RS forms one end of the plant, the flowers FL, leaves L and buds B form the other end of the plant. In the schematic drawing of FIG. 1 a non-fruit bearing plant is shown, but it will be apparent that a plant may also comprise fruits as it comprises leaves, flowers and buds.

The stem structure connects the flowers FL, leaves L and buds B to the root system RS and has one or more of the following functions:
  1) support for and the elevation of leaves, flowers and fruits (if present);
  2) transport of fluids between the roots and the leaves, flowers and fruits (if present);
  3) storage of nutrients; and
  4) production of new living tissue.

In the shown example, the plant comprises a main stem MS which acts as the main support for all other plant parts except the root system RS and through which all fluids passes. In this example, the main stem MS supports the leaves L and other stems, in this case flower stem FS. The flower stem FS in turn is split up into three flower sub-stems FS1, FS2, FS3. Flower sub-stems FS1 and FS2 each carry one flower FL. Flower sub-stem FS3 is split into sub-stems FS3A and FS3B each carrying a bud B, which will later on develop into a flower FL as well.

The methods described in this specification may be applied to all kind of stems of the stem structure. However, in practice, the user will choose a specific stem for carrying out the method depending on the purpose, i.e. the intended destination, of the substances to be introduced into the plant.

When for instance the substance is intended for only the leaves L of the plant of FIG. 1 or for all leaves L, flowers FL and buds B, the method will preferably be carried out in relation to the main stem MS, as introducing the substance into the main stem MS will usually result in the substance being distributed to all parts of the plant carried by the main stem MS.

When for instance the substance is not intended for the leaves L but for the flowers FL and buds B, the method is preferably carried out in relation to the flower stem FS. Likewise, if the substance is only intended for the buds B and not for any other part of the plant P, the method is preferably carried out in relation to the flower sub-stem FS3. As the methods can be applied to all kind of stems, only the general term stem is and will be used throughout the remaining detailed description of the invention.

It will be apparent to the skilled person that alternative to choosing a single specific stem, it is also possible to carry out the method in relation to multiple stems of a plant. For instance, if a substance is intended for the flowers and buds, the method may be carried out in relation to flower stem FS as described above, but alternatively, the method may be carried out in relation to flower sub-stems FS1, FS2 and FS3.

Figure 2:
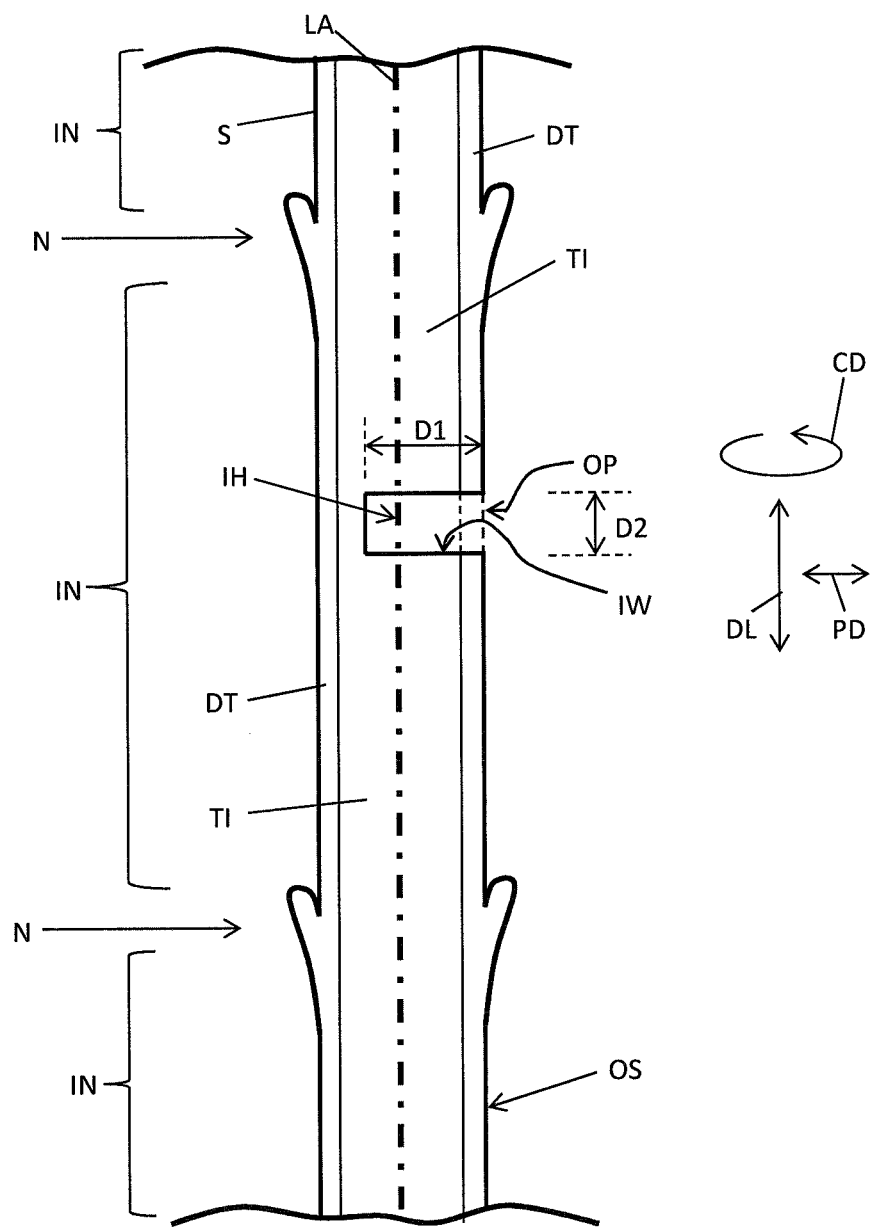
FIG. 2 depicts a cross-section of a stem of a plant in which a hole is formed in accordance with an embodiment of the invention.

FIG. 2 depicts a cross-section of a stem S of a plant, e.g. a plant according to FIG. 1. The stem S of a plant is usually divided into nodes N and internodes IN in between nodes N.

The nodes N may hold buds (not shown here) which grow into one or more leaves, sub-stems or flowers as shown in FIG. 1.

The stem comprises dermal tissue DT, which may alternatively be referred to as epidermis, defining an outer surface OS of the stem S and usually functions to waterproof, protect and control gas exchange. Plant tissue TI below the dermal tissue comprises vascular tissue and ground tissue filling in around the vascular tissue. The vascular tissue provides long distance transport in the form of xylem and phloem, alternatively referred to as xylem system and phloem system of a plant. The substance introduction methods described in this specification rely amongst others on the xylem and/or phloem transport systems in order to distribute the introduced substance throughout the plant, where the xylem is preferred as it has a single known transport direction where the phloem may be multi-directional. Hence, the distribution of the substance throughout the plant via the xylem system is more predictable.

The stem S defines a longitudinal axis LA. This allows to define and describe some directions in relation to the longitudinal axis LA. A first direction DL is oriented parallel to the longitudinal axis LA of the stem, a second direction PD is oriented perpendicular to the longitudinal axis LA of the stem, and a third direction is a circumferential direction CD around the longitudinal axis LA of the stem.

FIG. 2 depicts a hole IH. Below it will be assumed that the situation in FIG. 2 is an intermediate situation between forming the initial hole and the formation of the final hole.

The initial hole IH in FIG. 2 extends from an opening OP in the outer surface OS of the stem S in the second direction PD into the tissue TI, so beyond the dermal tissue DT in order to get access to the long distance transportation system, preferably the xylem. The depth D1 of the initial hole in this example is larger than the radius of the stem at this location, and is in this case also larger than the diameter D2 of the hole IH.

The initial hole IH comprises a interior wall IW delimiting the initial hole from the tissue in the stem of the plant. When a substance is introduced into the initial hole, the substance needs to penetrate the plant by passing the interior wall IW in order to be taken up by the plant, e.g. by the transportation system of the plant.

The initial hole may be formed by drilling or cutting, but in an embodiment is formed by inserting a hypodermic needle with a beveled tip into the stem. The beveled tip has the advantage that the needle has a sharp tip able to penetrate the dermal tissue and that the entire beveled portion of the tip forms a cutting surface which can be used to form the initial hole by subsequent rotation of the needle about its longitudinal axis, preferably after it has been brought to the desired depth D1. Rotating the needle will then cut through the tissue and allow for easy removal of the plant tissue.

Although the shown hole IH is a clean hole from which all plant material has been removed, it is also possible that the hypodermic needle only makes a circular cut without removing the tissue inside.

When the hypodermic needle is manually inserted into the stem of the plant, it can be advantageous to use a hypodermic needle, wherein the length of the beveled tip is substantially the same as the desired hole depth D1. In that case, the hypodermic needle can be inserted into the stem until the first moment the beveled tip is completely inserted into the stem. This will aid in preventing the hypodermic needle from being inserted to deep and extending through the plant on the opposite side of the opening OP. In that way, it is ensured that a blind hole as in FIG. 2 is formed. However, it is also possible to make a through hole. In that case, no precautions preventing a tool from extending through the stem need to be taken.

Figure 3:
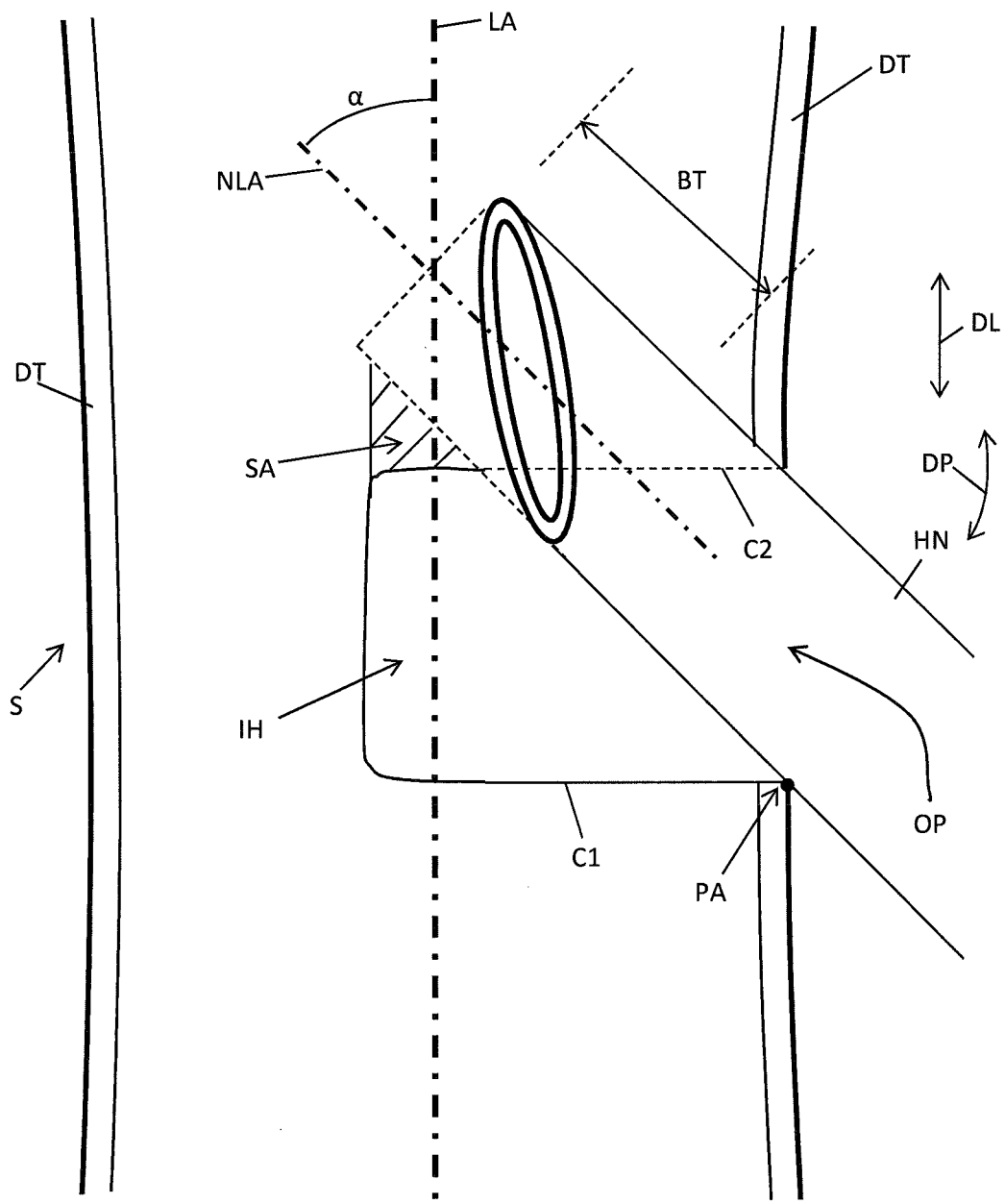
FIG. 3 depicts a cross-section of a stem of a plant in which a hole is formed in accordance with another embodiment of the invention.

FIG. 3 depicts the formation of a final hole according to an embodiment of the invention.

FIG. 3 is a close-up of the stem S of FIG. 2 at the initial hole IH. The contour of the initial hole of FIG. 2 is the solid line C1 in combination with the dashed line C2. A hypodermic needle HN with a beveled tip BT is inserted in the stem via the opening OP of the initial hole IH, but the difference with respect to the formation of the initial hole IH is that the longitudinal axis NLA of the needle makes an acute angle α with the longitudinal axis LA of the stem. Subsequently rotating the needle about its longitudinal axis NLA make a cut, thereby extending the initial hole in a first direction DL (see FIG. 2) parallel to the longitudinal axis LA of the stem. Plant material may be removed while retracting the hypodermic needle or even afterwards, but as indicated above, this removal of plant material is not necessary for the invention.

When in FIG. 3 the needle is steadily positioned and perfectly rotated about its longitudinal axis, this will result in the formation of a ridge in the final hole indicated by the shaded area SA. However, in order to create a smoother final hole, this shaded area may also be removed simply by pivoting the needle up and down in a direction indicated by reference symbol DP with the lower edge PA of the opening OP being a pivot axis. The needle may thus also be advantageously used to scrape plant material away.

Other methods for extending the size of the initial hole to form a final hole according to the invention may also be used, such as drilling, suction, chemical etching, vaporizing, piercing, cutting, etc.

Figure 4:
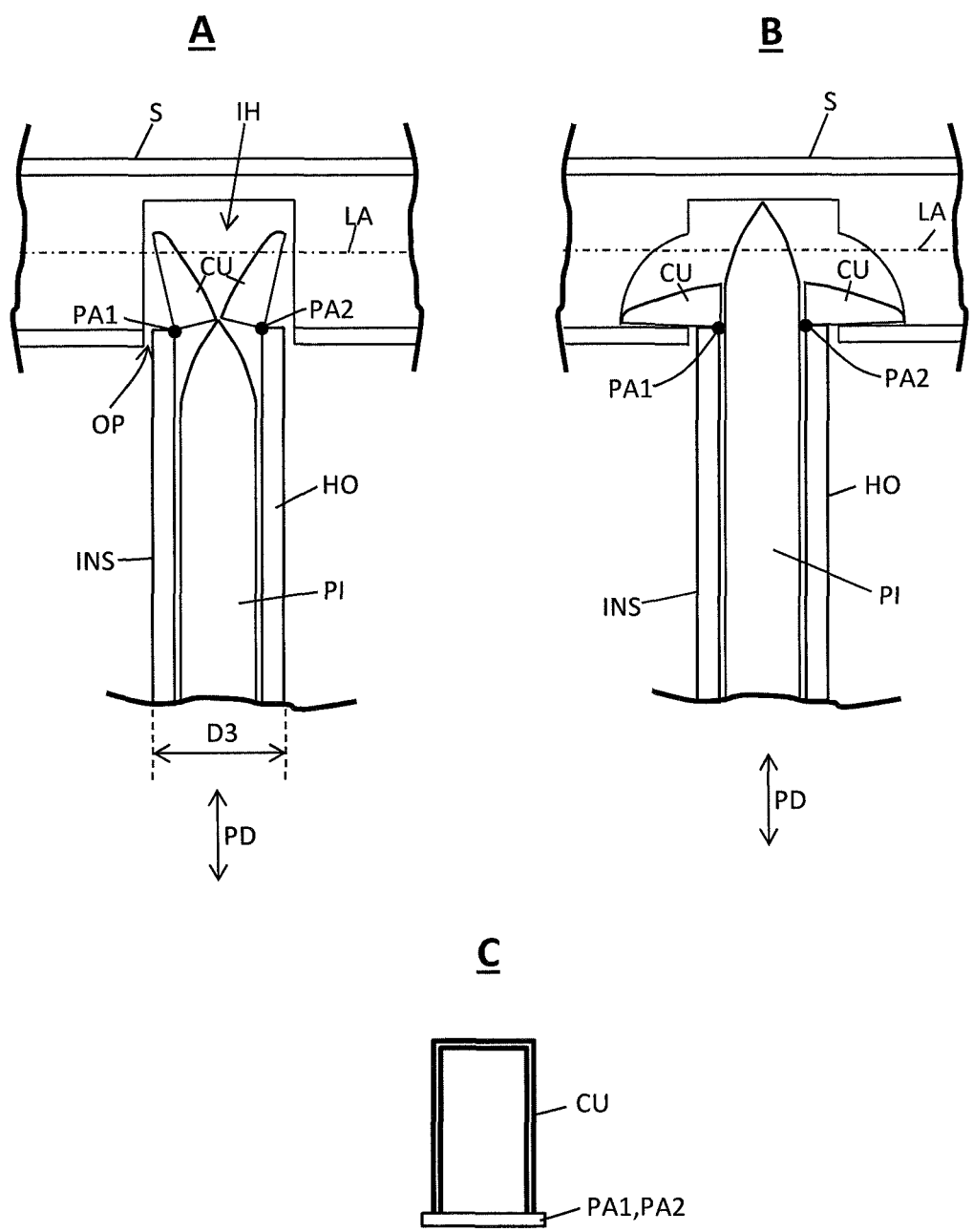
FIG. 4A-4C depict the formation of a hole according to a further embodiment of the invention.

Another plant hole size extending method is shown in FIGS. 4A and 4B. In FIG. 4A, a stem S of a plant is shown with its longitudinal axis LA. An initial hole IH with opening OP is made in the stem similar to the situation of FIG. 2. The final hole in this embodiment is made by inserting a free end of an instrument INS into the initial hole IH via the opening OP.

The instrument IN comprises a housing HO and two cutters CU pivotably arranged at the free end of the housing about pivot axes PA1, PA2, respectively. The cutters have a rest position as shown in FIG. 4A in which the cutters do not extend sideways outside of the diameter D3 of the housing HO. This allows to insert the cutters into the initial hole IH via the opening OP.

When the cutters CU are positioned in the initial hole IH, the cutters can be pivoted to an operational position as shown in FIG. 4B by moving a pin PI relative to the housing HO in a direction indicated by PD, so that the pin PI pushes, i.e. pivots, the cutters towards the operational position of FIG. 4B thereby cutting through the tissue. The cut part of the tissue may be removed in many ways including suction, scraping and cutting. Scraping can for instance be done by slowly retracting the housing HO while the pin PI is retracted relative to the housing HO to ensure that the opening OP of the hole is not significantly affected by this operation.

The cutters may be urged towards the rest position by a resilient element provided between the two cutters CU or between each cutter CU and the housing HO. It is also possible that the cutters are hingedly connected to the pin PI and thus retracting the pin PI also retracts the cutters C.

FIG. 4C depicts a side view of the cutters CU and shows the respective pivot axes PA1, PA2 without the other parts of the instrument. In this embodiment, the cutters CU have an inverted U-shape, so that an effective cut is made allowing to remove the plant material as easily as possible.

In both embodiments relating to FIG. 3 and FIGS. 4A-4C, the final hole has a dimension in a direction parallel to the longitudinal axis of the stem of the plant which is larger than a maximum dimension of the opening OP in the direction parallel to the longitudinal axis of the stem. A difference between the embodiment of FIG. 3 and the embodiment of FIGS. 4A-4C is that in the embodiment of FIG. 3 the initial hole IH is extended in one direction only, preferably away from the roots of the plant, where in the embodiment of FIGS. 4A-4C, the initial hole is extended in both directions, so away and towards the roots of the plant.

FIGS. 5A-5D depict schematically an embodiment of a container CO according to the invention.

Figure 5:
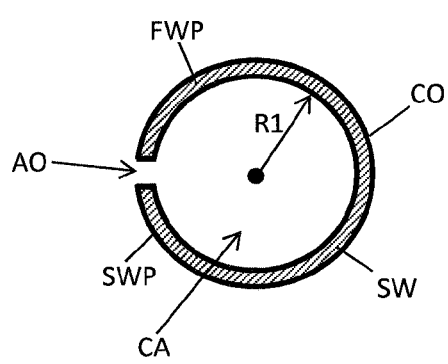
FIG. 5A-5D depict different views of containers in accordance with different embodiments according to the invention arranged around the stem of a plant at the location of a hole in the stem.
Figure 5:
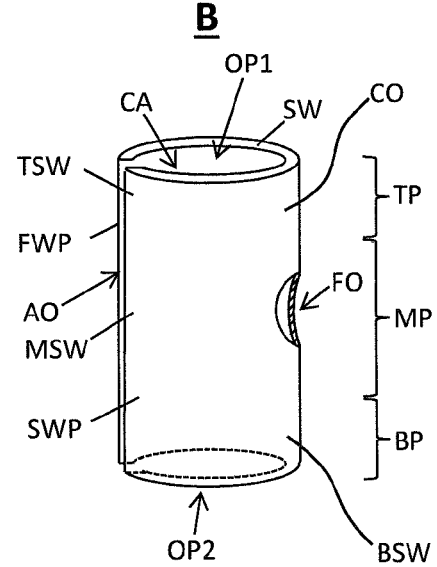
Figure 5:
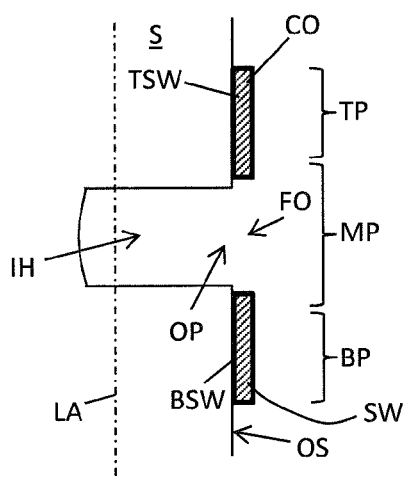
Figure 5:
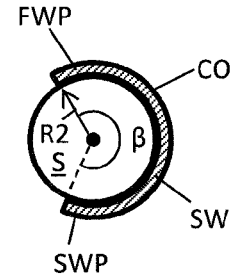

FIG. 5A is a top cross-sectional view of the container CO in unassembled state. FIG. 5B is a perspective side view of the container CO in unassembled state. FIG. 5C is a cross-sectional view of a part of the container when arranged on a stem S of a plant. FIG. 5D is another cross-section view of the container when arranged on the stem S of a plant.

The container CO has a tubular cylindrical shape which is not necessary, but preferred as the stem S of a plant usually also has a cylindrical shape seen in cross-section. The container CO comprises a bottom portion BP, a middle portion MP and a top portion TP, wherein the top portion TP is provided with an opening OP1 and the bottom portion BP is provided with an opening OP2. The container CO further comprises a cavity CA extending between the opening OP1 in the top portion and the opening OP2 in the bottom portion, wherein the container CO is configured to receive the stem S of a plant in the cavity CA.

The cavity CA is delimited by a side wall SW comprising a bottom side wall portion BSW, a top side wall portion TSW and a middle side wall portion MSW in between the bottom and top side wall portions, which are respectively associated with the bottom portion BP, top portion TP and middle portion MP of the container CO.

The bottom wall side portion is configured to sealingly engage with an outer surface OS of a stem S of a plant. In this embodiment, also the top side wall portion and the middle side wall portion are configured to sealingly engage with the outer surface of the stem S, so that the area around an opening OP of a hole IH can be closed off to prevent leakage of the substance when the container is filled with substance. The container CO is filled with substance via a fill opening FO in a middle portion of the container CO. In this embodiment, the fill opening FO is preferably aligned with the opening OP of the hole IH when arranging the container CO around the stem of the plant.

The side wall SW further comprises a first wall portion FWP and a second wall portion SWP that can be moved away from each other to form or increase the size of an additional opening AO in the side wall SW extending between the opening OP1 in the top portion and the opening OP2 in the bottom portion. The additional opening AO allows the stem S to be brought into and out of the cavity CA via the additional opening AO. When the container comprises elastic material, this is for instance done by performing the following steps:
  moving the two wall portions FWP and SWP of the side wall of the container away from each other to form or increase the size of the additional opening until the stem of the plant is able to pass the additional opening to be received in the cavity CA of the container;
  moving the container over the stem S until the stem has passed the additional opening thereby entering the cavity; and
  releasing the two wall portions of the side wall of the container thereby arranging the container around the stem of the plant.

The inner radius R1 of the container in the unassembled state is therefore preferably smaller than the radius R2 of the stem. In that case the additional opening is also larger in assembled state than in unassembled state. However, in order to properly clamp on the stem, the container covers an angle β of at least 180 degrees.

In an alternative embodiment it is possible that the first wall portion FWP and the second wall portion SWP overlap even when the container is arranged around the stem of the plant. In that case the first wall portion and the second wall portion can be connected to each other, thereby fixing the container and possibly applying a pretension.

In another alternative embodiment, the first and second wall portion are permanently connected to each other, so that in other words, the cavity of the container is delimited by a continuous side wall having no possibility to form an additional opening extending between the openings OP1 and OP2.

Figure 6:
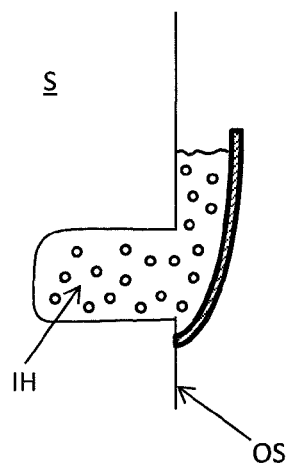
FIG. 6A-6C depict three cross-sections of the same stem of a plant, wherein in each cross-section a different container according to respective embodiments of the invention is shown.
Figure 6:
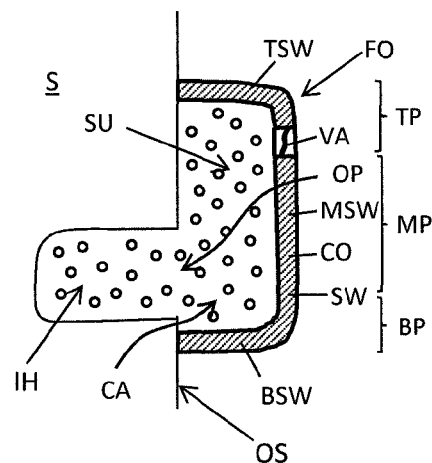
Figure 6:
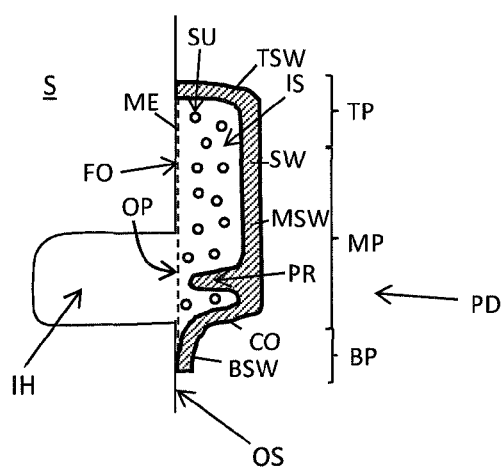

FIG. 6A-6C depict three other embodiments of a container according to the invention. FIG. 6A depicts a container CO having a bottom portion BP, a middle portion MP and a top portion TP, wherein the bottom portion bends inwards with respect to the top and middle portions. The container CO comprises a cavity delimited by a side wall SW which comprises a bottom side wall portion BSW, a middle side wall portion MSW and a top side wall portion TSW associated with the bottom portion, middle portion and top portion, respectively. Due to the inwards bending bottom portion, the bottom side wall portion is configured to sealingly engage with the outer surface OS of the stem S of the plant, while the top side wall portion is still at a distance from the outer surface of the stem to create a fill opening FO to fill the container with a substance SU. The container is preferably configured such that the opening OP of the hole IH in the stem is situated near the bottom side wall, so that substantially all of the substance is able to enter the hole IH and a minimal amount of substance SU is trapped below the opening OP.

In FIG. 6B, a similar container CO is depicted, but a difference with the container of FIG. 6A is that the top portion TP also bends inwards, so that upon arranging the container CO around the stem S of the plant, at least the bottom side wall portion BSW and the top side wall portion TSW sealingly engage with an outer surface OS of the stem S of the plant, thereby allowing in this embodiment to form a closed cavity. This configuration allows to pressurize the container when the container CO comprises elastic material. The fill opening FO, which in this embodiment is located in the top portion TP of the container, then preferably comprises a one-way valve VA, which allows substance SU to enter the cavity CA through the fill opening FO, but prevents substance SU from escaping from the cavity via the fill opening.

Also in this embodiment, the opening OP of the hole IH is preferably located near the engagement between bottom side wall portion BSW and outer surface OS of the stem S to allow substantially all of the substance to enter the hole via the opening OP.

FIG. 6C depicts another embodiment of a container according to the invention. The container CO is different from the embodiments shown in FIGS. 6A and B, because it allows to prefill the container. The container can be divided into a bottom portion BP, a middle portion MP and a top portion TP and comprises a side wall SW which analogue to the bottom, middle and top portion comprises a bottom side wall portion BSW, a middle side wall portion MSW and a top side wall portion TSW. The bottom side wall portion BSW and the top side wall portion TSW are bend inwards, so that they define fill opening FO and membrane ME extending from the bottom side wall portion BSW to the top side wall portion TSW closes off the fill opening and forms a closed internal space IS as part of the cavity which can be prefilled via the fill opening FO with substance SU before the container CO is arranged around the stem S of the plant. Because after the container is arranged around the stem of the plant, the fill opening FO of the container is no longer freely accessible, a protrusion PR is provided in the middle portion MP of the container which allows to pierce through the membrane ME after arranging the container around the stem of the plant to release the substance SU. In a preferred embodiment as shown in FIG. 6C, the container is arranged around the stem S of the plant such that the protrusion is aligned with the opening OP of the hole IH in the stem of the plant. Piercing can then take place by pushing on the middle portion MP of the container, so that the protrusion PR is pushed towards the membrane ME in the direction PD and enters the hole IH thereby putting so much stress on the membrane that an opening will be made to release the substance SU which will then enter the hole IH.

Figure 7:
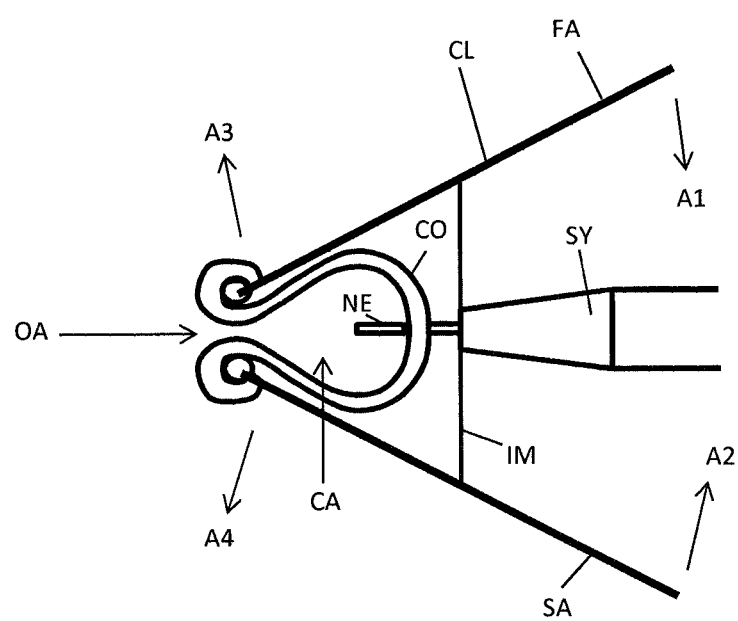
FIG. 7 depicts a top view of a container according to a further embodiment of the invention.

FIG. 7 depicts a top view of a container CO according to yet another embodiment of the invention. The container CO in FIG. 7 is in the unassembled state.

In top view the container CO has a semi-circular shape with both ends of the shape bending outwards to engage with a clamp CL. The clamp Cl comprises first arm FA and a second arm SA connected to each other via an intermediate member IM. By manually pushing on the first and second arm FA, SA on the right side of the intermediate member in FIG. 7, as indicated by arrows A1, A2, the left side of the clamp CL will open as indicated by arrows A3, A4.

Due to the engagement between the clamp CL and the container CO, opening the clamp will also open an additional opening AO of the container to allow the container to be arranged on a stem of a plant.

Preferably, the clamp CL is made of elastic material, wherein more preferably, the equilibrium position as shown in FIG. 7 defines a cavity CA that is smaller than a cross section of the stem on which the container is to be arranged. As a result thereof the container and clamp are elastically deformed when arranged on the stem keeping the container and clamp on the stem and possibly providing a seal between the container and the stem.

An advantage of the clamp may be that the container not necessarily has to be made of elastic material and that the clamp may provide a larger clamping force than a single container, thereby improving the seal.

The clamp may also be used as support for a part of a substance supply system. Shown in FIG. 7 are a syringe SY and a needle NE connected to the intermediate member IM and extending through the container CO. An advantage may be that the assembly as shown in FIG. 7 is pre-assembled and with a single action the container including supply system are arranged on the stem, with the needle extending into a hole in the stem, so that substance introduction can start right away.

The invention claimed is:

1. A method for introducing a substance into a plant, said method comprising the following steps:
   forming a hole into a stem of the plant to get access to a transportation system of the plant;
   arranging a container around the stem of the plant, such that substances held by the container are able to enter the transportation system of the plant through the hole in the stem, wherein the container comprises elastic material, wherein the container has a cavity and two openings at opposite sides of the cavity so that the container can be arranged around the stem of the plant, wherein the cavity is delimited by a continuous wall, and wherein arranging the container around the stem of the plant comprises the following steps:
      stretching the elastic material of the container such that the size of the openings and cavity are increased for passing other plant portions such as leaves, flowers, buds or branches;
      moving the container over the plant until the container is in a desired position with respect to the stem of the plant; and
      releasing the elastic material of the container, so that the container engages with the stem of the plant and is thereby arranged around the stem of the plant; and
   filling the container with the substance to introduce the substance into the plant through the hole.

2. The method according to claim 1, wherein filling the container with the substance comprises the steps of temporarily connecting the container to a reservoir, transferring a predetermined amount of substance from the reservoir to the container, and disconnecting the reservoir from the container, such that the substance mainly enters the transportation system of the plant through the hole in the stem when the reservoir and container are disconnected from each other.

3. The method according to claim 1, wherein filling the container with the substance comprises the steps of connecting the container to a reservoir, transferring substance from the reservoir to the container, and disconnecting the reservoir from the container, such that the substance mainly enters the transportation system of the plant through the hole in the stem when the reservoir and container are connected to each other.

4. The method according to claim 1, wherein forming the hole into the stem comprises drilling.

5. The method according to claim 1, wherein forming the hole into the stem comprises inserting a hypodermic needle with a beveled tip into the stem and subsequently rotating the needle about its longitudinal axis, wherein during these steps the longitudinal axis of the needle is perpendicular to a longitudinal axis of the stem.

6. The method according to claim 1, wherein forming the hole into the stem comprises inserting a hypodermic needle with a beveled tip into the stem and subsequently rotating the needle about its longitudinal axis, wherein during these steps the longitudinal axis of the needle makes an acute angle with respect to a longitudinal axis of the stem.

7. The method according to claim 1, comprising the step of removing the container from the stem.

8. The method according to claim 1, comprising the step of closing the hole in the stem.

9. The method according to claim 8, wherein the hole in the stem is closed using wax and/or the interior wall is provided with a layer of wax.

10. The method according to claim 9, further comprising the step of pressurizing the container.

11. The method according to claim 1, wherein filling the container with the substance occurs prior to forming the hole.

12. A method for introducing a substance into a pot plant, said method comprising the following steps:
   forming a hole into a stem of the plant to get access to a transportation system of the plant;
   arranging a container around the stem of the plant, such that substances held by the container are able to enter the transportation system of the plant through the hole in the stem, wherein the container comprises elastic material, wherein the container has a cavity and two openings at opposite sides of the cavity so that the container can be arranged around the stem of the plant, wherein the cavity is delimited by a wall with two wall portions that can be moved away from each other to form or increase the size of an additional opening extending between the two openings of the container, and wherein arranging the container around the stem of the plant comprises the following steps:

moving the two wall portions of the wall of the container away from each other to form or increase the size of the additional opening;

moving the container over the stem until the stem has passed the additional opening thereby entering the cavity; and releasing the two wall portions of the wall of the container, such that the container engages with the stem of the plant; and filling the container with the substance to introduce the substance into the plant through the hole.

13. The method according to claim 12, wherein filling the container with the substance comprises the steps of temporarily connecting the container to a reservoir, transferring a predetermined amount of substance from the reservoir to the container, and disconnecting the reservoir from the container, such that the substance mainly enters the transportation system of the plant through the hole in the stem when the reservoir and container are disconnected from each other.

14. The method according to claim 12, wherein filling the container with the substance comprises the steps of connecting the container to a reservoir, transferring substance from the reservoir to the container, and disconnecting the reservoir from the container, such that the substance mainly enters the transportation system of the plant through the hole in the stem when the reservoir and container are connected to each other.

15. The method according to claim 12, wherein forming the hole into the stem comprises drilling.

16. The method according to claim 12, wherein forming the hole into the stem comprises inserting a hypodermic needle with a beveled tip into the stem and subsequently rotating the needle about its longitudinal axis, wherein during these steps the longitudinal axis of the needle is perpendicular to a longitudinal axis of the stem.

17. The method according to claim 12, wherein forming the hole into the stem comprises inserting a hypodermic needle with a beveled tip into the stem and subsequently rotating the needle about its longitudinal axis, wherein during these steps the longitudinal axis of the needle makes an acute angle with respect to a longitudinal axis of the stem.

18. The method according to claim 12, comprising the step of removing the container from the stem.

19. The method according to claim 12, comprising the step of closing the hole in the stem.

20. The method according to claim 19, wherein the hole in the stem is closed using wax and/or the interior wall is provided with a layer of wax.

21. The method according to claim 12, further comprising the step of pressurizing the container.

22. A method for introducing a substance into a plant, said method comprising the following steps:

forming a hole into a stem of the plant to get access to a transportation system of the plant;

arranging a container around the stem of the plant, such that substances held by the container are able to enter the transportation system of the plant through the hole in the stem, wherein the container comprises flexible non-elastic material, and wherein arranging the container around the stem of the plant comprises the following steps:

folding the container around the stem of the plant to form a cavity and two openings at opposite sides of the cavity, wherein the cavity is delimited by a wall with two wall portions that can be separated from each other to form an additional opening extending between the two openings of the container, so that the stem of the plant is introduced into the cavity via the additional opening; and connecting the wall portions together; and filling the container with the substance to introduce the substance into the plant through the hole.

23. The method according to claim 22, wherein filling the container with the substance comprises the steps of temporarily connecting the container to a reservoir, transferring a predetermined amount of substance from the reservoir to the container, and disconnecting the reservoir from the container, such that the substance mainly enters the transportation system of the plant through the hole in the stem when the reservoir and container are disconnected from each other.

24. The method according to claim 23, wherein the hole in the stem is closed using wax and/or the interior wall is provided with a layer of wax.

25. The method according to claim 22, wherein filling the container with the substance comprises the steps of connecting the container to a reservoir, transferring substance from the reservoir to the container, and disconnecting the reservoir from the container, such that the substance mainly enters the transportation system of the plant through the hole in the stem when the reservoir and container are connected to each other.

26. The method according to claim 22, wherein forming the hole into the stem comprises drilling.

27. The method according to claim 22, wherein forming the hole into the stem comprises inserting a hypodermic needle with a beveled tip into the stem and subsequently rotating the needle about its longitudinal axis, wherein during these steps the longitudinal axis of the needle is perpendicular to a longitudinal axis of the stem.

28. The method according to claim 22, wherein forming the hole into the stem comprises inserting a hypodermic needle with a beveled tip into the stem and subsequently rotating the needle about its longitudinal axis, wherein during these steps the longitudinal axis of the needle makes an acute angle with respect to a longitudinal axis of the stem.

29. The method according to claim 22, comprising the step of removing the container from the stem.

30. The method according to claim 22, comprising the step of closing the hole in the stem.

31. The method according to claim 22, further comprising the step of pressurizing the container.

\* \* \* \* \*